Dec. 15, 1964   J. M. HARRER ETAL   3,161,571
BOILING-WATER NUCLEAR REACTOR
Filed Nov. 21, 1960   3 Sheets-Sheet 1

INVENTORS
Joseph M. Harrer
Charles F. Bullinger
Verne M. Kolba
By:
Attorney

Dec. 15, 1964    J. M. HARRER ETAL    3,161,571
BOILING-WATER NUCLEAR REACTOR
Filed Nov. 21, 1960    3 Sheets-Sheet 2
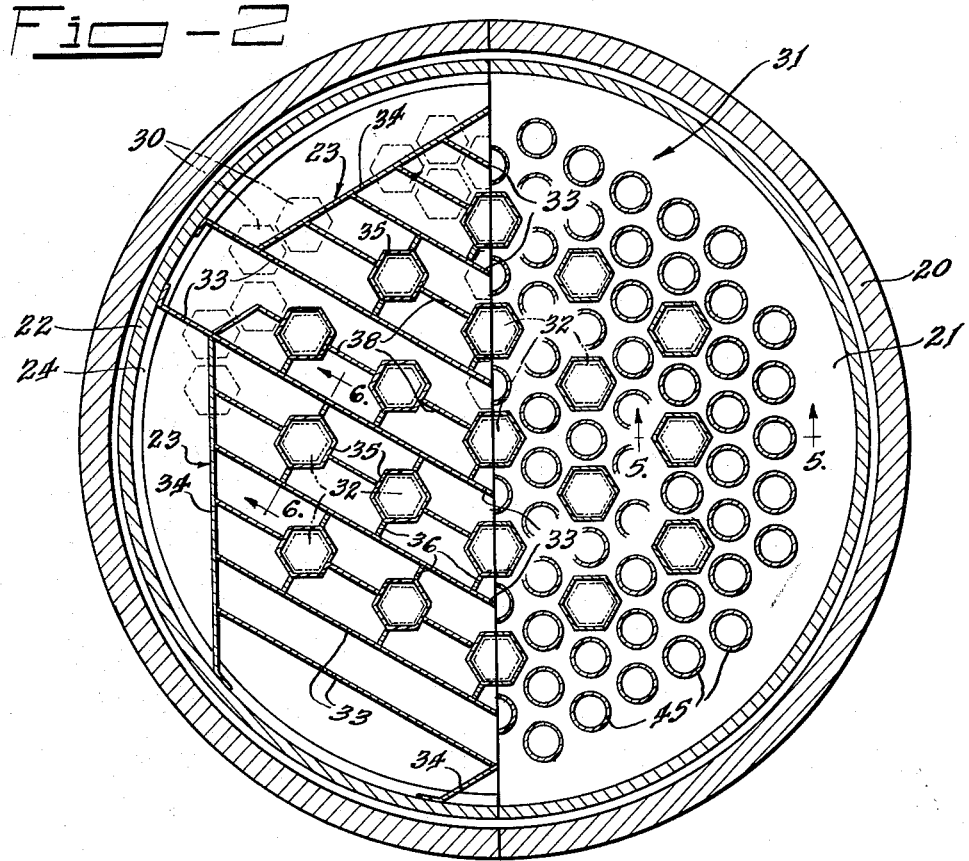
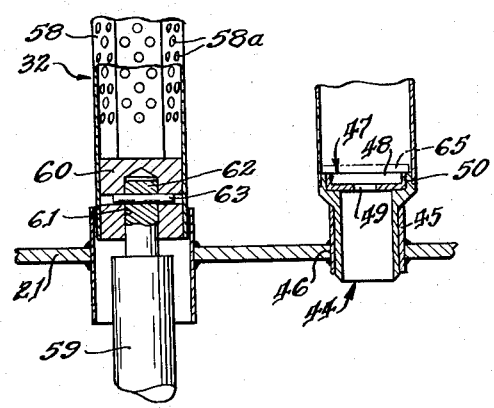
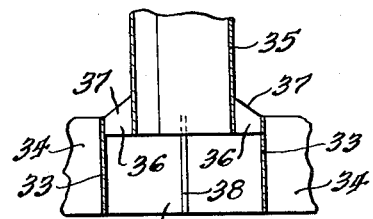
INVENTORS
Joseph M. Harrer
Charles F. Bullinger
Verne M. Kolba
By:
Roland A. Anderson
Attorney Dec. 15, 1964     J. M. HARRER ETAL     3,161,571
BOILING-WATER NUCLEAR REACTOR
Filed Nov. 21, 1960     3 Sheets-Sheet 3
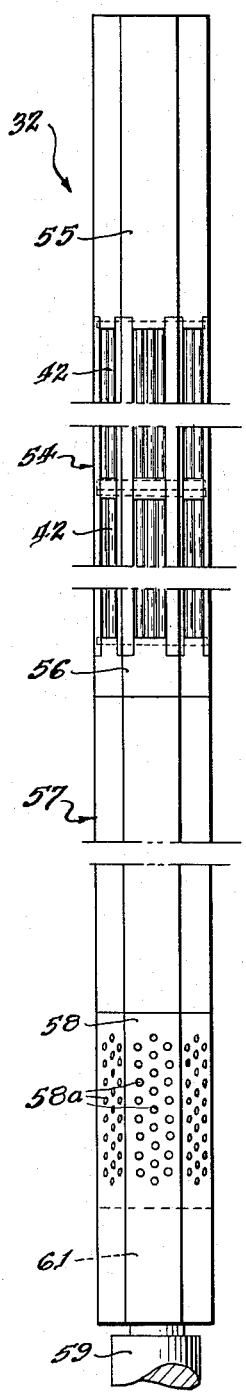
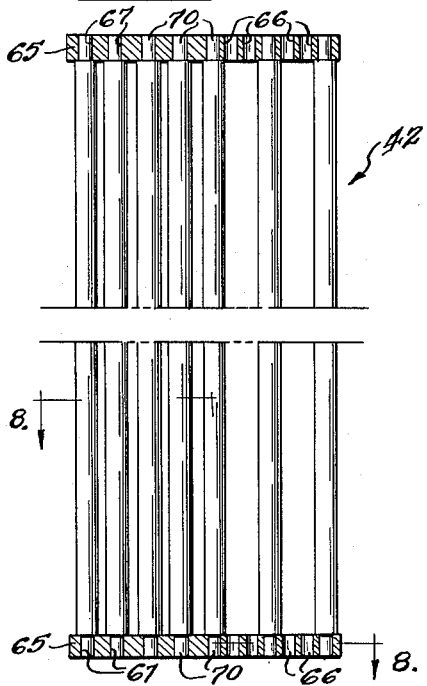
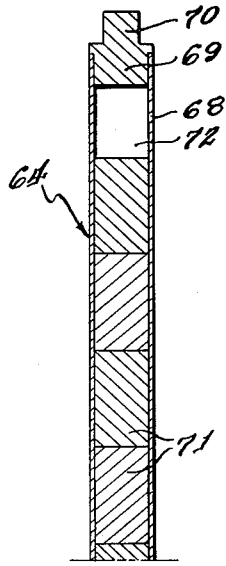
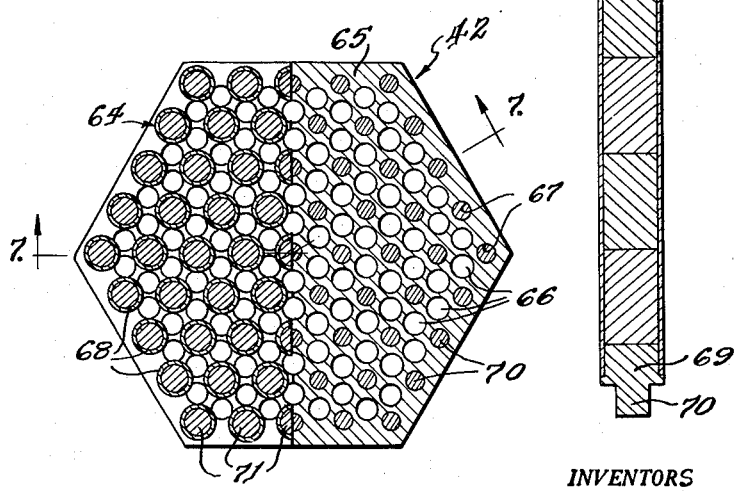
INVENTORS
Joseph M. Harrer
Charles F. Bullinger
Verne M. Kolba
By: Roland A. Anderson
Attorney United States Patent Office 3,161,571
Patented Dec. 15, 1964

3,161,571
BOILING-WATER NUCLEAR REACTOR
Joseph M. Harrer, Elmhurst, Ill., Charles F. Bullinger, Palo Alto, Calif., and Verne M. Kolba, Plainfield, Ill., assignors to the United States of America as represented by the United States Atomic Energy Commission
Filed Nov. 21, 1960, Ser. No. 70,878
1 Claim. (Cl. 176—54)

This invention relates generally to nuclear reactors. In more detail the invention relates to boiling-water reactors for use as a source of heat in central station power plants and to fuel assemblies therefor.

It is accepted at present that nuclear power plants are not competitive economically with conventional oil and coal fired boilers. One of the leading contenders for recognition as the first competitive nuclear power plant is one employing a boiling-water reactor as heat source.

A major objective of reactor designers and engineers is to bring costs down to the point where economical power can be produced. The present invention is directed toward an improved construction of a boiling-water reactor and of a fuel assembly therefor in which costs of operation of the reactor are reduced. Costs of operation are reduced by reducing the inventory of fuel required for operaton of the reactor. This is accomplished by providing means whereby the fuel can be rotated through different locations in the reactor core to obtain improved utilization thereof.

It is accordingly an object of the present invention to develop a more economic boiling-water reactor than those now in existence.

It is an additional object of the present invention to develop a novel fuel assembly for a nuclear reactor by which improved utilization of the reactor fuel is attained.

It is a more specific object of the present invention to develop a fuel assembly which makes it possible to turn the reactor core inside out to prolong fuel life and provide more uniform burnup of the fuel.

These and other objects of the present invention are attained in accordance with our invention by a boiling-water reactor employing a split fuel construction. The fuel assemblies for the reactor comprise basket-like holders containing two fuel units each of which is symmetric about a plane located midway of the ends of the unit and perpendicular to the longitudinal axis of the unit and has the same cross-sectional shape as does the holder, said fuel units being formed of a plurality of spaced parallel fuel elements containing a material fissionable by neutrons of thermal energy. By this construction the ends of the fuel units nearest together can be moved to be farthest apart and the fuel units at the center can be moved radially away from the center whereby maximum utilization of the fuel is attained.

The invention will next be described in connection with the accompanying drawings wherein:

FIG. 2 is a horizontal cross-sectional view taken on the line 2—2 of FIG. 1;

FIG. 4 is a front elevational view of a control assembly;

FIG. 5 is an enlarged vertical cross-sectional view taken on the line 5—5 of FIG. 2;

FIG. 6 is an enlarged vertical cross-sectional view taken on the line 6—6 of FIG. 2;

FIG. 7 is a vertical cross-sectional view of a single fuel unit taken on the line 7—7 of FIG. 8;

FIG. 8 is an enlarged horizontal cross-sectional view taken on the line 8—8 of FIG. 7; and FIG. 9 is a vertical cross-sectional view of a fuel element.

Figure 1:
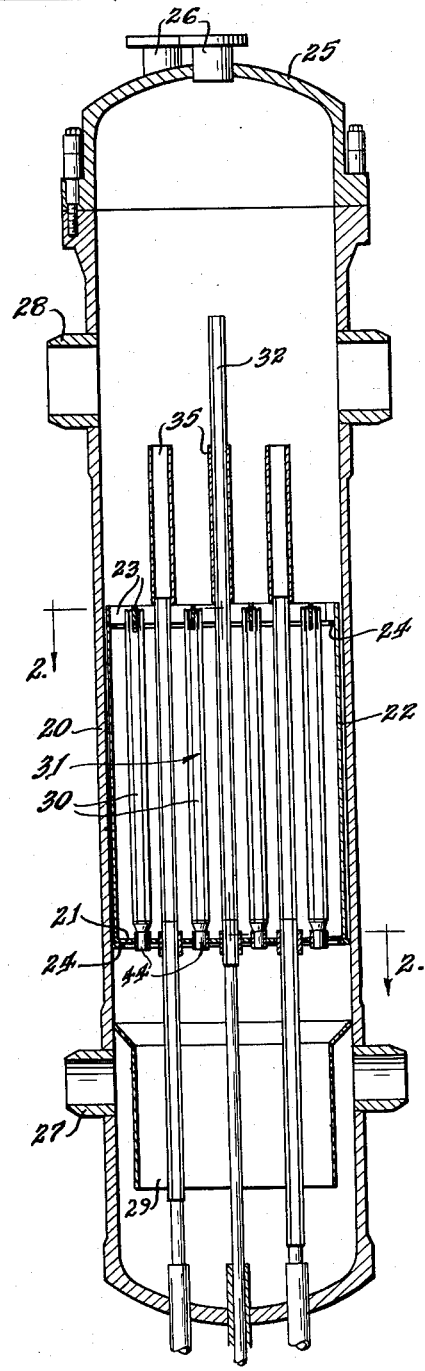
FIG. 1 is a vertical cross-sectional view of a nuclear reactor incorporating the present invention.

Referring now to FIG. 1 of the drawings, the nuclear reactor comprises a pressure vessel 20 having a lower support grid 21 extending across the pressure vessel, a cylindrical thermal shield 22, located just inside the pressure vessel 20, supported by the lower support grid 21, and an upper guide grid 23 which extends across the pressure vessel and which is supported by thermal shield 22 by means of support ring 24. Pressure vessel 20 is a right circular cylinder having an ellipsoidal top head 25 which is penetrated by instrumentation nozzles 26. Four inlet nozzles 27 are provided near the bottom of pressure vessel 20 and four outlet nozzles 28 are provided near the top of pressure vessel 20. A cylindrical baffle 29 directs water entering the reactor through the inlet nozzles 27 to the bottom of pressure vessel 20 and assures uniform flow of water through the reactor. A plurality of vertical hexagonal fuel assemblies 30 which are arranged in a triangular pattern and are supported by the lower support grid 21 and restrained from lateral movement by upper guide grid 23 make up reactor core 31. Hexagonal control assemblies 32, supported and operated from below the pressure vessel 20, are disposed about a central assembly 32 in concentric hexagons on a triangular lattice, each control assembly 32 being separated from the nearest adjacent control assembly by a single fuel assembly 30.

As shown in FIG. 2, upper guide grid 23 is formed in two separately removable sections and comprises a plurality of spaced parallel rectangular guide bars 33. The ends of all of the bars 33 of each section are connected by side bars 34 so that the two sections together approximate the shape of a regular hexagon. Certain of the bars 33 and 34 are extended to and removably fastened to the thermal shield 22 from which the entire grid 23 is supported. Hexagonal control assembly shrouds 35 are disposed between adjacent pairs of guide bars 33, except for the outermost pairs, and extend upwardly therefrom. They are attached to the top thereof by spacer bars 36 which have a triangular upper portion 37 for additional strength as shown in FIG. 6. Shrouds 35 are joined to each other and to side bars 34 by means of connecting pieces 38.

Figure 3:
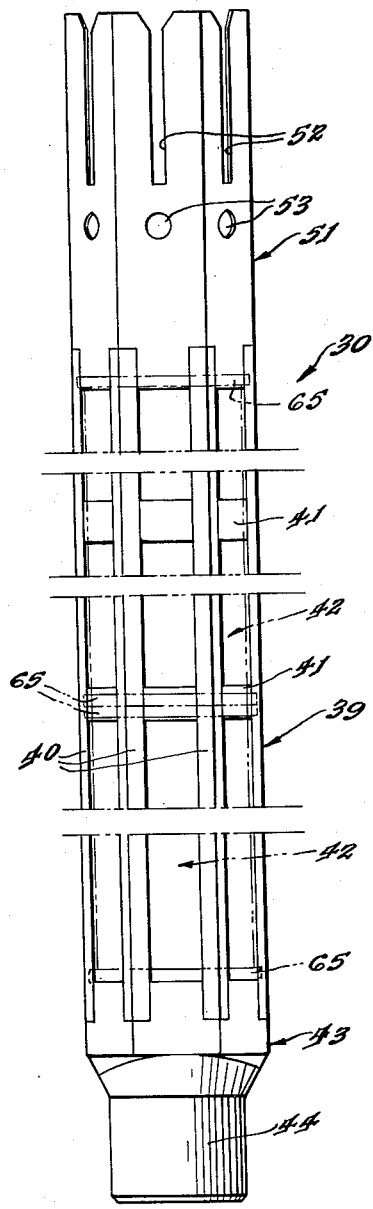
FIG. 3 is a front elevational view of a fuel assembly constructed according to the present invention showing two fuel units in phantom.

Fuel assemblies 30 are shown in more detail in FIG. 3. These assemblies comprise an open basket-like holder 39 formed of six 120-degree angle strips 40 arranged at the corners of a regular hexagon and held in place by three spacer bands 41. Holder 39 contains two removable fuel units 42. Holder 39 includes a cylindrical lower end fitting 43 having a portion 44 of reduced diameter which fits in fuel holder guide tubes 45 which are welded in apertures 46 in lower support grid 21. (See FIG. 5.) Lower end fitting 43 includes a removable orifice 47 comprising a hexagonal disc 48 having an opening 49 therethrough and upturned edges 50 upon which the lower fuel unit 42 rests. Holder 39 also includes a hexagonal upper end fitting 51 which includes six elongated vertical open slots 52, each disposed in the center of one of the sides of the hexagon. Handling openings 53 are also provided in upper end fitting 51. As is clear from FIGS. 1, 2 and 3, the reduced portions 44 of lower end fittings 43 of holders 39 are disposed in guide tubes 45, whereby the lower support grid 21 supports the reactor core 31. After the fuel assemblies 30 are seated in the lower support grid 21, the upper guide grid 23 is placed in position over the fuel assemblies 30 so that guide bars 33, side bars 34 and connecting pieces 38 are disposed in slots 52 of upper end fitting 51 of holder 40. Since the guide grid 23 meshes with slots 52, the fuel assemblies 30 are positively restrained from lateral movement.

A control assembly 32 is shown in more detail in FIG. 4. Control assembly 32 includes a basket-like fuel-holder section 54 which contains two fuel units 42. Holder section 54 is the same as holder 39 and contains identical fuel units 42, except that it does not include lower and upper end fittings 43 and 51. Rather than including lower and upper end fittings 43 and 51, control assembly 32 includes an upper handling box 55 above holder section 54 and a transition piece 56, a control section 57 and a coolant inlet section 58 having perforations 58a therein below holder section 54. All of these sections are hexagonal in form. The control assembly 32 is operated from below by a cylindrical control assembly extension 59. The control section is made up of 2% boron-stainless steel plate ¼ inch thick. As shown in FIG. 5, the control assembly 32 is connected to control assembly extension 59 by means of a latch block 60 having an aperture 61 therein into which a finger 62 of extension 59 extends, and the latch block 60 and finger 62 are held together by pin 63.

The mechanical control system is completely adequate for all conditions encountered with the reactor hot. However, there is a deficiency in control of the cold reactor, mainly due to the decreased control rod worth in the cold condition. This deficiency, which is a shutdown phenomenon, can be overcome by the addition of $H_3BO_3$. Approximately 0.0013 mol of $H_3BO_3$ per mol of $H_2O$ will be required for the initial core; at equilibrium approximately 0.001 mol $H_3BO_3$ per mol of $H_2O$ will be required. These concentrations are about one-tenth of the solubility limit of $H_3BO_3$ at the temperatures considered.

Fuel units 42 are shown in more detail in FIGS. 7 and 8. Fuel units comprise a plurality of parallel cylindrical fuel elements 64 comprise a plurality of parallel cylindrical fuel elements 64 extending between identical upper and lower fuel support and spacer grids 65. Grids 65 include flow apertures 66 and mounting opening 67 therein. As shown in FIG. 9, fuel elements 64 comprise a metallic cylinder 68 having end plugs 69 at both ends thereof. End plugs include a positioning shaft 70 which is disposed within openings 67 in upper and lower grids 65. Fuel elements 64 include a plurality of short cylindrical pellets 71 of uranium dioxide with a helium-filled gap 72 at the top thereof.

In operation, coolant water enters the reactor at the bottom through inlet nozzles 27, is directed downwardly by baffle 29 and then upwardly through orifice 47 to and through fuel units 42. Water also enters perforations 58a in coolant inlet section 58 of control assemblies 32 and passes upwardly through control assemblies 32 past the fuel units 42 contained therein. A mixture of water and steam is withdrawn from pressure vessel 20 through outlet orifices 28 and is transported to an external steam drum. Dry and saturated steam from the drum flows to a turbine, the turbine feed water is returned to the steam drum and the reactor circulating water and turbine return are force-circulated back to the reactor.

The following are the parameters of a specific reactor according to the present invention.

A. Reactor description:
 (1) Reactor vessel I.D., in. _____ 73.
 (2) Reactor vessel inside length, ft. ____ 30.94.
 (3) Reactor vessel shell thickness _____ 2.625.
 (4) Reactor vessel shipping weight, lbs. _____ 148,000.
 (5) Thermal shield material _____ 1% boron SS.
  O.D. (nominal), in. _____ 71.
  Inner shield thickness, in. _____ 1.0.
 (6) Reflector thickness, in. _____ 4.5.

B. Fuel description:
 (1) Fuel material _____ $UO_2$.
 (2) Pellet diameter, in. _____ .417.
 (3) Gap material _____ He, 2 at. pressure.
 (4) Gap thickness, in. _____ .0015.
 (5) Clad material _____ Zr–2.
 (6) Clad thickness, in. _____ .025.
 (7) Fuel rod O.D., in. _____ .470.
 (8) Fuel section length, in. _____ 40.5.
 (9) Axial gap, in. _____ 1.75.
 (10) Active zone length, in. _____ 81.
 (11) Triangular lattice pitch, in. _____ .6.

C. Core description:
 (1) Active zone length, in. _____ 82.75.
 (2) Active diameter, ft. _____ 5.0.
 (3) Fuel assembly shape _____ Hexagon.
 (4) Lattice pitch, in. _____ 5.125.
 (5) Fuel elements per assembly _____ 61.
 (6) Assemblies per core _____ 121.
 (7) Fuel assemblies _____ 102.
 (8) Control assemblies _____ 19.
 (9) Rods per core _____ 7381.

D. Core materials:
 (1) Wt. of $UO_2$, lbs. _____ 29,459.
 (2) Vol. Zr–2/volume inside clad _____ .4.
 (3) Vol. $H_2O$+steam/volume inside clad _____ 1.4.

E. Other:
 (1) Fuel enrichment (feed), atom percent _____ 2.65.
 (2) Fuel enrichment (discharge), atom percent _____ 1.60.
 (3) Total reactor power (design), mw. _____ 165.

One of the important aspects of the present invention is the fuel management scheme made possible by the construction of the reactor core. Since it is well known that burnup of fuel is higher at the center of a reactor core than at the outside, the present construction provides means for moving the fuel through a predetermined path through the reactor to obtain maximum burnup of the fuel. The present construction makes it possible not only to move the fuel radially from the center outwardly, but it also makes it possible to turn the reactor core inside out by reversing the location of the fuel at the vertical center of the reactor core and that at the top and bottom of the reactor core. In accordance with the preferred fuel management scheme, the reactor core is divided into four concentric zones, with zone 1 being at the center of the reactor and zone 4 at the edge of the reactor. The zones have equal areas, but an odd number of fuel assemblies. The number of fuel assemblies per zone varies from a minimum of 25 to a maximum of 27. The first two cycles starting with a fresh core are not typical. The following table illustrates this scheme.

|  | Atypical |||||||||||| Typical ||||||||||||
| Zone → | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 |
|---|---|---|---|---|---|---|---|---|---|---|---|---|---|---|---|---|---|---|---|---|---|---|---|---|
|  | T$A_T$B | T$B_T$B | T$C_T$B | T$D_T$B | T$D_T$B | T$C_T$B | T$B_B$B | T$A_B$B | T$E_T$B | T$D_B$B | T$C_B$B | T$B_B$B | T$F_T$B | T$E_B$B | T$D_B$B | T$C_B$B | T$G_T$B | T$F_B$B | T$E_B$B | T$D_B$B | T$H_T$B | T$G_B$B | T$F_B$B | T$E_B$B |
| ↑ Axial<br>└ Radial → | T$A_B$B | T$B_B$B | T$C_B$B | T$D_B$B | T$D_B$B | T$C_B$B | T$B_T$B | T$A_T$B | T$E_B$B | T$D_T$B | T$C_T$B | T$B_T$B | T$F_B$B | T$E_T$B | T$D_T$B | T$C_T$B | T$G_B$B | T$F_T$B | T$E_T$B | T$D_T$B | T$H_B$B | T$G_T$B | T$F_T$B | T$E_T$B |
|  | Start |||| 1st Change |||| 2nd Change |||| 3rd Change |||| 4th Change |||| 5th Change ||||

A—H denote fuel loading.
T denotes top fuel unit.
B denotes bottom fuel unit.

As shown in the table, fuel moves from zone 1 (center) to zone 2 after reversing top and bottom halves; thence to zone 3 and zone 4 progressively without reversal (reversal is optional in going from 3 to 4—it gains only a very small amount of reactivity). Starting with the third cycle (i.e., after the first two cycles have been completed) the fuel in zone 4 is removed for processing at each loading change.

The first two cycles are not typical because of the start from a fresh core. There is enough reactivity in this core to run 62% longer than the cycle time after equilibrium is reached. At this point, fuel in both center zones is reversed and the core is turned inside out: zone 1 is traded with zone 4 and zone 2 with zone 3. As rearranged, this core for the second cycle is still more reactive than the equilibrium core, and can burn about 3% excess time (the next core is a little less reactive, giving 4% less time than standard; the next gives 2% more; and then the transient is completely damped).

After the second cycle, both zones 1 and 2 are top-bottom switched before moving outward. Thereafter, only zone 1, as already described, is switched.

As the original core is progressively unloaded, it is less burned than the subsequent material. The first quarter-core to be removed has 77% of reference burnup; the second, 85%; the third, 96%; and the fourth, 93%. Thereafter, 100% of reference burnup is achieved.

The technique of fuel management is preferable to straight full-core burnup, primarily because it allows the balancing of low-reactivity spent fuel against high-reactivity fresh fuel. The fuel management scheme employing split fuel assemblies as described herein is preferable to other schemes, such as radial shuffling only of fuel assemblies or inversion of fuel assemblies, because it provides more fuel cycle flexibility than either of the other systems. Splitting the core at the axial center allows one to obtain the maximum reactivity gain when the fuel is moved or replaced.

A theoretical analysis comparing the split fuel approach with axial inversion of elements shows that the required initial enrichment of a 165 mw.(t) reactor is 2.65 using a divided fuel assembly and 3.12 using an invertible fuel assembly. The lower enrichment requirement and other factors which have been taken into account result in a fuel cost of 4.54 mills/kw.(e) for a reactor employing divided fuel assemblies as against a fuel cost of 5.95 mills/kw.(e) for a reactor employing invertible fuel assemblies. The fuel cost without any kind of fuel management is, of course, higher yet.

In the specific construction employed the holder serves both as guide for the insertion of the fuel and as a support for the fuel in the reactor. This specific construction is advantageous because the holder can remain in the reactor and is reusable for a number of fuel cycles.

It will be understood that this invention is not to be limited to the details given herein but that it may be modified within the scope of the appended claim.

What is claimed is:

A boiling-water nuclear reactor comprising a pressure vessel, a lower support grid extending across the pressure vessel, a thermal shield located just inside the pressure vessel and supported by the lower grid, an upper guide grid formed in two sections extending across the pressure vessel within the thermal shield, control assembly shrouds attached to the top of said upper guide grid, a plurality of vertical fuel assemblies extending between said lower support grid and said upper guide grid, said fuel assemblies consisting of an open top basket-like fuel holder having a lower end fitting removably set in said lower support grid and an upper end fitting of the same width as the holder having elongated, vertical slots therein, said upper grid meshing with said slots, two fuel units each of which is symmetric about a plane located midway of the ends of the unit and perpendicular to the longitudinal axis of the unit having the same cross-sectional shape as does the holder removably disposed in each of said fuel holders, said fuel units being formed of a plurality of spaced parallel fuel elements containing a material fissionable by neutrons of thermal energy, and a plurality of control assemblies disposed in the array and vertically movable in the control assembly shrouds.

References Cited by the Examiner

UNITED STATES PATENTS

| 2,841,545 | 7/58 | Zinn | 176—18 |
| 2,961,393 | 11/60 | Monson | 176—18 |
| 2,977,297 | 3/61 | Evans et al. | 176—81 |
| 2,982,713 | 5/61 | Sankovich et al. | 176—61 |
| 2,987,458 | 6/61 | Breden et al. | 176—73 |
| 2,990,349 | 6/61 | Roman | 176—42 |
| 2,999,059 | 9/61 | Treshow | 176—47 |
| 3,014,853 | 12/61 | Sheehan | 29—469 |
| 3,070,537 | 12/63 | Treshow | 176—78 |

FOREIGN PATENTS

| 1,214,056 | 11/59 | France. |
| 1,246,699 | 10/60 | France. |

OTHER REFERENCES

APAE-8, Army Package Power Reactor Zero Power Experiments (ZPE-1), February 8, 1957, pp. 21–24.

Nucleonics, April 1958 (vol. 16, No. 4), foldout between pp. 56 and 57.

Directory of Nuclear Reactors, vol. 1, June 1959, pp. 15–20 and 39–44.

CARL D. QUARFORTH, *Primary Examiner.*